US008552987B2

(12) United States Patent
Kuroume et al.

(10) Patent No.: US 8,552,987 B2
(45) Date of Patent: Oct. 8, 2013

(54) SYSTEM AND/OR METHOD FOR DISPLAYING GRAPHIC TO INPUT INFORMATION

(75) Inventors: Tomoaki Kuroume, Kyoto (JP); Tetsuya Sasaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 884 days.

(21) Appl. No.: 11/225,015

(22) Filed: Sep. 14, 2005

(65) Prior Publication Data
US 2006/0071914 A1 Apr. 6, 2006

(30) Foreign Application Priority Data

Oct. 6, 2004 (JP) .................................. 2004-293280

(51) Int. Cl.
*G06F 3/041* (2006.01)
*G06F 3/048* (2006.01)

(52) U.S. Cl.
USPC .......................................... 345/173; 715/773

(58) Field of Classification Search
USPC ................. 345/467, 630, 156–184, 780, 781; 705/34; 715/727, 741, 805, 816, 781, 715/773; 84/477; 700/18
See application file for complete search history.

(56) References Cited

U.S. PATENT DOCUMENTS

| 4,931,987 | A  | * | 6/1990  | Kawakami ..................... 715/208 |
| 5,543,591 | A  |   | 8/1996  | Gillespie et al. |
| 5,680,527 | A  | * | 10/1997 | Sakaguchi ..................... 345/627 |
| 6,128,010 | A  |   | 10/2000 | Baxter et al. |
| 6,545,669 | B1 |   | 4/2003  | Kinawi et al. |
| 6,603,478 | B1 | * | 8/2003  | Kuo et al. ...................... 345/467 |
| 6,661,920 | B1 | * | 12/2003 | Skinner ......................... 382/187 |
| 2001/0015729 | A1 | * | 8/2001  | Eguchi .......................... 345/630 |
| 2002/0157521 | A1 | * | 10/2002 | Shahal ......................... 84/477 R |
| 2002/0167545 | A1 | * | 11/2002 | Kang et al. .................... 345/780 |
| 2002/0175948 | A1 | * | 11/2002 | Nielsen et al. ................ 345/781 |
| 2003/0095104 | A1 | * | 5/2003  | Kandogan et al. ............ 345/168 |
| 2004/0064597 | A1 | * | 4/2004  | Trewin .............................. 710/8 |
| 2004/0104896 | A1 |   | 6/2004  | Suraqui |

(Continued)

FOREIGN PATENT DOCUMENTS

| JP | 04-195625 | 7/1992 |
| JP | 04-333912 | 11/1992 |

(Continued)

OTHER PUBLICATIONS

Harris, "E3 2004: Hands-On: PictoChat" May 11, 2004, URL:ds.ign. com/articles/513/513244p1.html., 4 pages.

(Continued)

*Primary Examiner* — Chanh Nguyen
*Assistant Examiner* — Sanghyuk Park
(74) *Attorney, Agent, or Firm* — Nixon & Vanderhye PC

(57) ABSTRACT

An information processing apparatus includes a display and a touch panel provided thereon. A CPU core causes the display to display an input screen (image) that has a keyboard image including a plurality of key patterns and an input area formed on each of the key patterns. By touching some of the key patterns, moving a stick or like to the input area while keeping it in a touch-on state and then performing a touch-off from the key pattern, a character graphic for the key pattern can be input (dragged) to a coordinate position in the input area just before the touch-off; however, by touching some of the key patterns and then performing a touch-off from the key pattern, a character graphic for the key pattern is input to a predetermined position in the input area.

32 Claims, 10 Drawing Sheets

(56) References Cited

U.S. PATENT DOCUMENTS

| | | | |
|---|---|---|---|
| 2005/0010307 A1* | 1/2005 | Dove et al. | 700/18 |
| 2005/0099400 A1* | 5/2005 | Lee | 345/173 |
| 2005/0102651 A1* | 5/2005 | Ueda | 717/113 |
| 2005/0125320 A1* | 6/2005 | Boesen | 705/34 |
| 2005/0140660 A1* | 6/2005 | Valikangas | 345/173 |
| 2005/0190147 A1* | 9/2005 | Kim | 345/156 |

FOREIGN PATENT DOCUMENTS

| | | |
|---|---|---|
| JP | 10-187339 | 7/1998 |
| JP | 2002-91676 | 3/2002 |
| JP | 2004-219524 | 8/2004 |

OTHER PUBLICATIONS

"PictoChat (DS)", May 12, 2004, http://media.ds.ign.com/media/682/682843/img__2127915.html, 2 pages.

Harris, "IGN: E3 2004: The Nintendo DS: Revealed", May 11, 2004, 3 pages, http://gameboy.ign.com/articles/513/51388pl.html.

"Nintendo DS for PS2 on Gamerhelp.com", 2005, 4, pages, http://www.gamerhelp.com/ds/NintendoDS/108619.shtml.

"Henohenomoheji" Wikipedia, 2007, 2 pages, http://en.wikipedia.org./wiki/Henohenomoheji.

Office Action dated Dec. 1, 2009 issued in corresponding Japanese Application No. 2004-293280.

* cited by examiner

FIG. 7  CHARACTER INPUT SCREEN EXAMPLE I
(TOUCH-ON TO "す" ("SU") KEY IS CONTINUED
FOR PREDETERMINED TIME OR MORE)
(A)
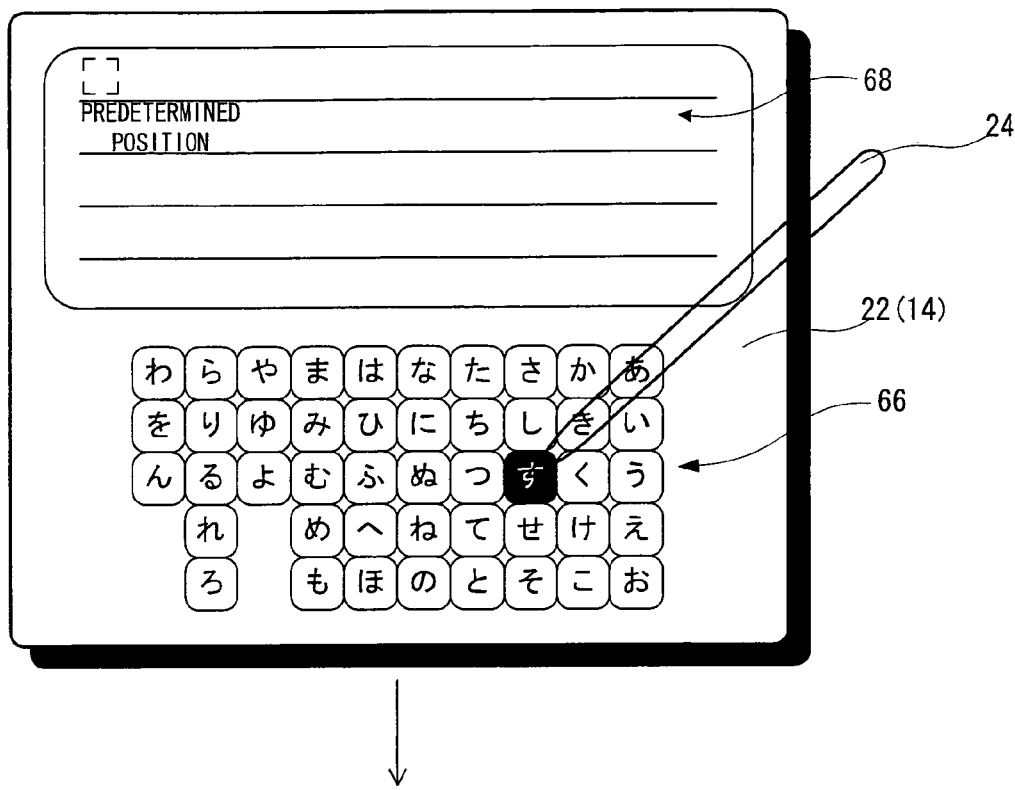
(B)
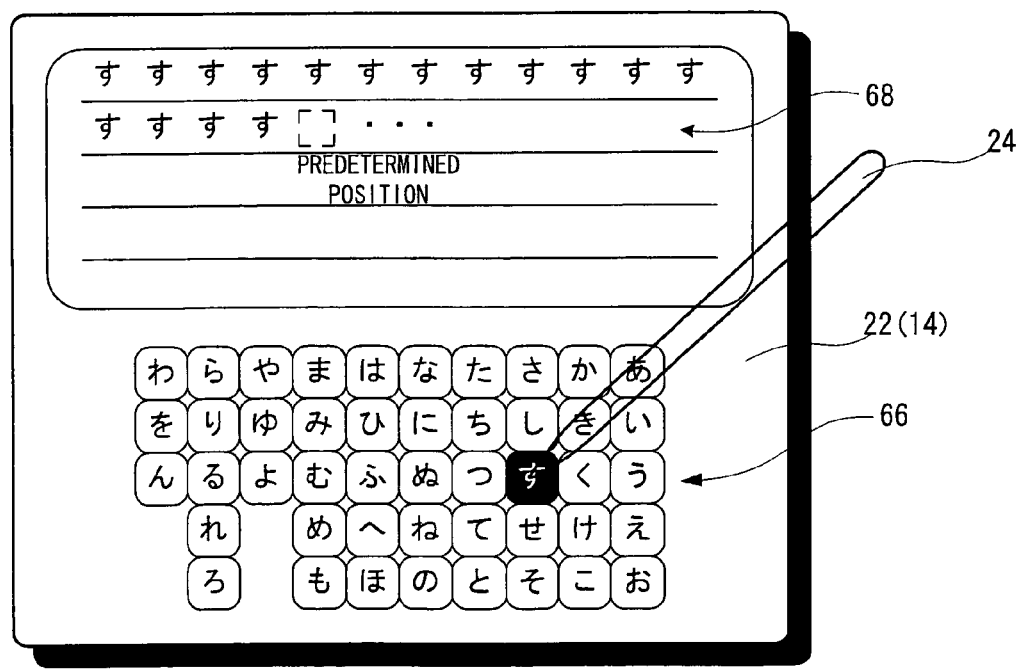

FIG. 8
CHARACTER INPUT SCREEN EXAMPLE II
(TOUCH-ON TO "す" ("SU") KEY IS PERFORMED AND,
IMMEDIATELY AFTER THAT, TOUCH-OFF IS PERFORMED
(A)
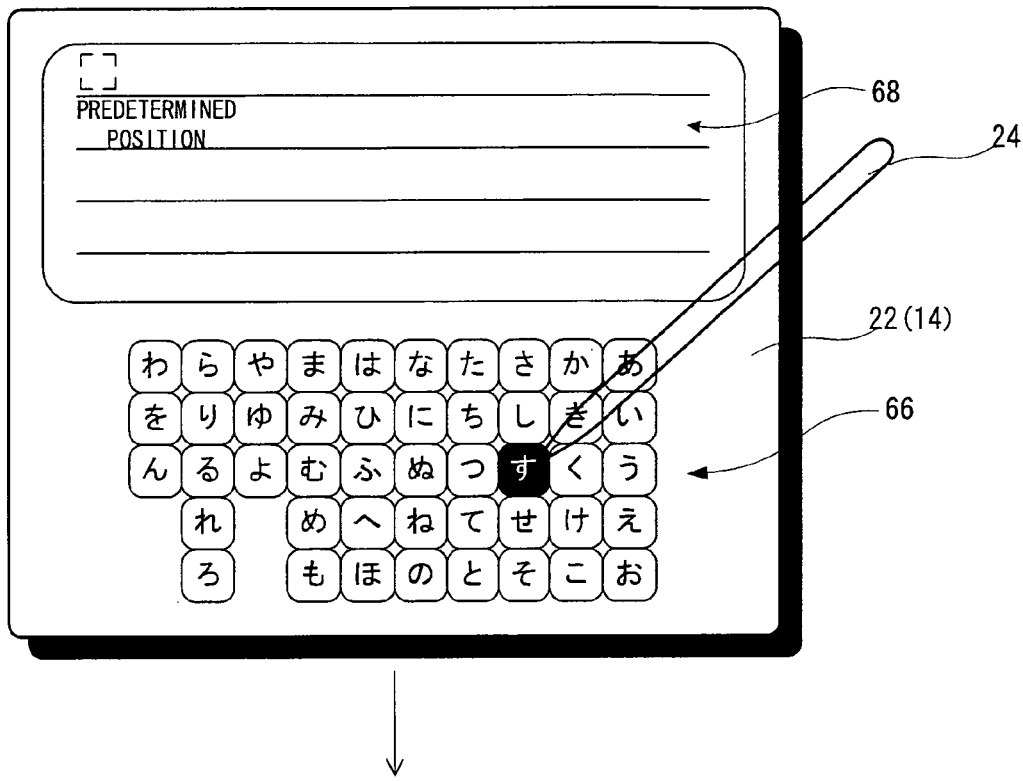
(B)
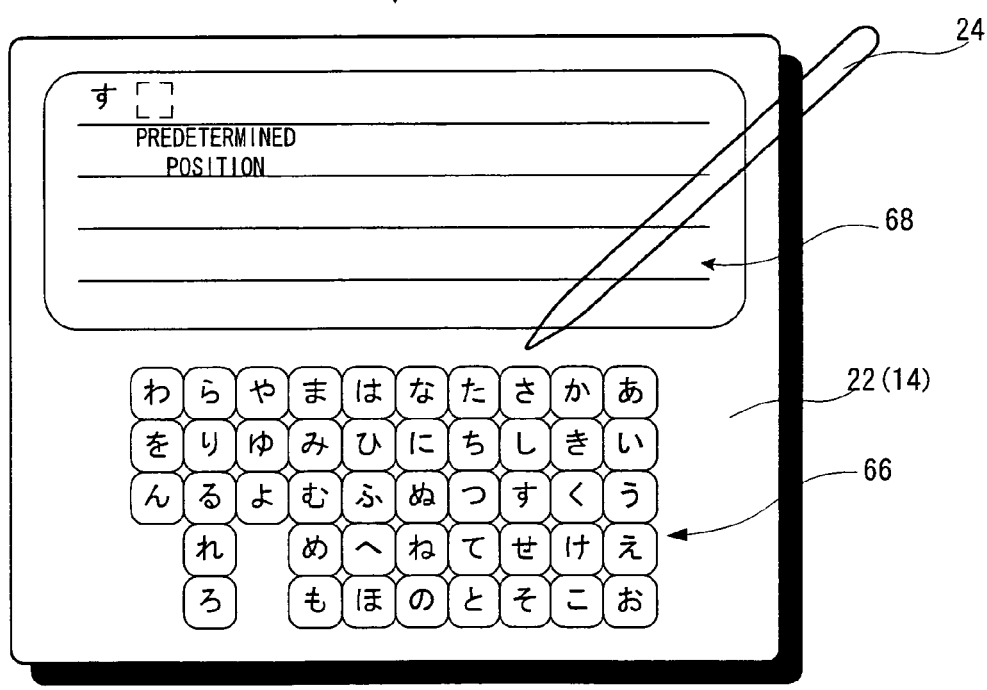

US 8,552,987 B2

SYSTEM AND/OR METHOD FOR DISPLAYING GRAPHIC TO INPUT INFORMATION

TECHNICAL FIELD

This application claims priority to Japanese Application No. 2004-293280 filed Oct. 6, 2004, the entire content of which is hereby incorporated by reference in this application.

The exemplary embodiments disclosed herein relate to an information processing apparatus and an information input program in the information processing apparatus. More specifically, the exemplary embodiments disclosed herein relate to an information processing apparatus in which a touch panel is provided on a liquid crystal display, key patterns and input area are displayed on the display, and key input is performed by operating the touch panel, and an information input program.

BACKGROUND AND SUMMARY

Prior art of this kind are disclosed in Japanese Patent Application Laying-open No. 10-187339 and Japanese Patent Application Laying-open No. 2002-91676.

In the prior art of Japanese Patent Application Laying-open No. 10-187339, key patterns are preprinted on the surface of the touch panel, and the touch time during which the user touches the touch panel with a finger is detected. When the touch time is more than a threshold value, the cursor is moved. When the touch time is less than the threshold value, the touch position is detected, and a graphic, number, symbol or the like printed in the position is input.

Also, in the prior art of Japanese Patent Application Laying-open No. 2002-91676, when one key (of the character "つ" (Japanese syllabic character hiragana "tsu"), for example) is pointed at, the graphics related to that ("づ" ("zu") and "っ", for example) are adjacently displayed. By moving toward these related graphics while pointing at the key and then stopping the pointing, the graphic at the time of stopping the pointing is input.

According to the above mentioned two prior art references, the display position of a graphic, etc. input by touching the touch panel is fixedly decided, and the user cannot freely select the display position.

Therefore, it is a feature of certain exemplary embodiments to provide a novel information processing apparatus and information input program.

It is another feature of certain exemplary embodiments to provide an information processing apparatus and information input program which make it possible to freely select or set a display position of a graphic, etc. input by operating a touch panel.

In a first exemplary embodiment, an information processing apparatus that comprises a display, a touch panel provided in relation to the display, a displaying means for displaying a plurality of key patterns and an input area on the display, a touch detecting means that detects a touch-on to or a touch-off from the touch panel at predetermined time intervals, a coordinate position detecting means that detects a coordinate position at a time when the touch detecting means detects the touch-on, a key pattern designation determining means that, when the touch detecting means detects a change of state from touch-off to touch-on, determines whether or not the coordinate position detected by the coordinate position detecting means designates any of the plurality of key patterns, a first coordinate position determining means that, after the key pattern designation determining means determines that some of the key patterns is designated, in response to the detection of a change to touch-off by the touch detecting means, determines whether the coordinate position detected by the coordinate position detecting means immediately before the change to touch-off is a position corresponding to the key pattern or an arbitrary position within the input area, and a first graphic displaying means that, when the first coordinate position determining means determines that the coordinate position at a position corresponding to the key pattern, displays a graphic associated with the key pattern in a predetermined position in the input area, and that, when the first coordinate position determining means determines the coordinate position is an arbitrary position within the input area, displays the graphic associated with the key pattern at the arbitrary position.

In the first exemplary embodiment, the information processing apparatus (10: a reference numeral indicative of a corresponding element in the embodiments. The same applies to the following reference numerals.) includes the display (14) and the touch panel (22) provided on the display. A processor, i.e., a CPU core (42) and a step S1 performed thereby function as displaying means. The displaying means (42, S1) causes the display to display an input screen (image) having the plurality of key patterns (66) like a keyboard and the input area (68). The touch detecting means (42, S3, S15, S27) detects at predetermined time intervals that a user touches the touch panel (22) (touch-on) or cancels the touch (touch-off) with a stick (24) or the like. When the touch detecting means detects the touch-on, the coordinate position detecting means (62b, S5, S17) detects a coordinate position at that time in the touch panel. The key pattern designation determining means (S7) determines whether or not the coordinate position at the time of detection of a change of state from touch-off to touch-on by the touch detecting means designates any one of the plurality of key patterns. Then, after the key pattern designation determining means determines that some of the key patterns is designated, when the touch detecting means detects a change to touch-off, the first coordinate position determining means (S29, S39) determines whether the coordinate position detected by the coordinate position detecting means immediately before the change to touch-off is a position corresponding to the key pattern or an arbitrary position within the input area. That is, when some of the key patterns is touched and then touch-off is performed, the first coordinate position determining means determines whether the coordinates at the time of the touch-off is in the position of the key pattern or an arbitrary position not indicative of the key pattern in the input area. Also, when the first coordinate position determining means determines that the coordinate at the time of touch-off is in the position corresponding to the key pattern, the first graphic displaying means (S31, S41) displays a character graphic associated with the key pattern at a predetermined position in the input area (a position subsequent to the previous input position, for example). Conversely, when the coordinate position is an arbitrary position within the input area, the first graphic displaying means displays the character graphic associated with the key pattern at the arbitrary position.

According to the first exemplary embodiment, the coordinate positions at the start (touch-on) and end (touch-off) of an operational input to the touch panel are detected. When the coordinate positions at the time of start and the time of end are on the same key pattern, a character graphic associated with the key pattern is displayed at a predetermined position in the input area. When the coordinate position at the time of start is on the key pattern but it is moved to an arbitrary position within the input area at the time of touch-off, the character graphic associated with the key pattern is displayed at the arbitrary position within the input area. That is, by touching a key pattern through a touch-on operation and moving the stick (24) or the like to an arbitrary position within the input area while keeping it in the touch-on state, it is possible to drag the character graphic for the key pattern into the arbitrary position. Accordingly, by means of this dragging technique, the user can freely select an input position within the input area, i.e., the display position of the character graphic associated with the key pattern.

A second exemplary embodiment is an information processing apparatus according to the first exemplary embodiment, which further comprises a time measuring means that, when the key pattern designation determining means determines that some of the key patterns is designated, counts a time during which the touch-on state continues, a duration time determining means that determines whether or not duration of the time measured by the time measuring means is equal to or more than a predetermined time, a second coordinate position determining means that, when the duration time determining means determines that the duration time is equal to or more than the predetermined time, determines whether or not the coordinate position detected by the coordinate position detecting means corresponds to the designated key pattern, and a second graphic displaying means that, when the second coordinate position determining means determines that the coordinate position is a position corresponding to the key pattern, displays the graphic associated with the key pattern at a predetermined position in the input area.

In the second exemplary embodiment, when the key pattern designation determining means (S7) determines that some of the key patterns is designated at the time of a change to touch-on, the time measuring means (64f, S11) counts the time during which the touch-on state continues. The duration time determining means (S19) determines whether or not the continuing time is equal to or more than a predetermined time. If the duration time is equal to or more than the predetermined time, the second coordinate position determining means (S21) determines whether or not the coordinate position detected by the coordinate position detecting means corresponds to the designated key pattern. If the coordinate position corresponds to the key pattern, the second graphic displaying means (S23) displays the character graphic associated with the key pattern at a predetermined position in the input area.

According to the second exemplary embodiment, when an input of a key pattern is continuously performed for a predetermined time or more, an image associated with the key pattern can be displayed at a predetermined position in the input area. That is, by continuously touching the one and same key pattern, after lapse of a specific time, the character graphic for the same key pattern can be input and displayed at a predetermined position in the input area at each time of touch detection.

A third exemplary embodiment is an information processing apparatus according to the first exemplary embodiment, which further comprises a valid key setting means that, when the touch detecting means detects a change of touch-off to touch-on, sets the designated key pattern determined by the key pattern designation determining means as a valid key, wherein when the first coordinate position determining means determines that the coordinate position is a position corresponding to the key pattern set as the valid key, the first graphic displaying means displays the graphic associated with the key pattern at a predetermined position in the input area, and when the first coordinate position determining means determines that the coordinate position is an arbitrary position within the input area, the first graphic displaying means displays the graphic associated with the key pattern at the arbitrary position, and the apparatus further comprises a canceling means that, when the touch detecting means detects a change of the touch-on to touch-off, cancels the setting of the valid key.

In the third exemplary embodiment, when a change takes place from touch-off to touch-on, the valid key setting means (S9) sets the designated key pattern determined by the key pattern designation determining means as a valid key. Also, when the second coordinate position determining means determines that the coordinate position is a position corresponding to the key pattern set as the valid key, the second graphic displaying means (S31) displays the character graphic associated with the key pattern at a predetermined position in the input area. However, when the second coordinate position determining means determines that the coordinate position is an arbitrary position within the input area, the second graphic displaying means displays the character graphic associated with the key pattern at the arbitrary position. Moreover, when the touch detecting means detects a change from touch-on to touch-off, the canceling means (S35) cancels the setting of the valid key.

According to the third exemplary embodiment, the key pattern indicated at the time of start of an operational input (touch-on) is set as a valid key, and the setting of the valid key is canceled at the end of the operational input (touch-off). Accordingly, even if the input coordinate position is changed by the above mentioned dragging operation, etc. from the key pattern designated at the time of start to another key pattern, it is possible to prevent the other key pattern from being input by mistake.

The present invention of a fourth exemplary embodiment is an information processing apparatus according to any one of the first through third exemplary embodiments, which further comprises a predetermined position setting means that, when the first graphic displaying means or the second graphic displaying means displays the graphic associated with the key pattern, sets a position related to the display position of the graphic as the predetermined position.

In the fourth exemplary embodiment, when the first graphic displaying means or the second graphic displaying means displays the character graphic associated with the key pattern, the predetermined position setting means (S25, S33) sets the position related to the display position of the character graphic as the predetermined position.

According to the fourth exemplary embodiment, the predetermined position as next character input position is set in the input area.

A fifth exemplary embodiment is a storage medium storing a program for information input in an information processing apparatus (10) comprising a display (14), a touch panel (22) provided in relation to the display, and a processor (42), the program causing the processor to perform the following steps of: a displaying step (S1) of causing the display to display a plurality of key patterns and an input area; a touch detecting step (S3, S15, S27) of detecting a touch-on to or a touch-off from the touch panel at predetermined time intervals; a coordinate position detecting step (S5, S17) of detecting a coordinate position at a time when the touch-on is detected in the touch detecting step; a key pattern designation determining step (S7) of, when a change of state from touch-off to touch-on is detected in the touch detecting step, determining whether or not the coordinate position detected in the coordinate position detecting step designates any of the plurality of key patterns; a first coordinate position determining step (S29, S39) of, after it is determined in the key pattern designation determining step that some of the key patterns is designated, in response to the detection of a change to touch-off in the touch detecting step, determining whether the coordinate position detected in the coordinate position detecting step immediately before the change to touch-off is a position corresponding to the key pattern or an arbitrary position within the input area; and a first graphic displaying step of, when it is determined in the first coordinate position determining step that the coordinate position is a position corresponding to the key pattern, displaying a graphic associated with the key pattern at a predetermined position in the input area, and, when it is determined in the first coordinate position determining step that the coordinate position is an arbitrary position within the input area, displaying the graphic associated with the key pattern at the arbitrary position.

In the fifth exemplary embodiment, the same advantages can be expected as those of claim 1.

A sixth exemplary embodiment is a storage medium according to the fifth exemplary embodiment, wherein the program further causes the processor to perform the following steps of: a time measuring step (S11) of, when it is determined in the key pattern designation determining step that some of the key patterns is indicated, counting a time during which the touch-on state continues; a duration time determining step (S19) of determining whether or not the duration time counted in the time measuring step is equal to or more than a predetermined time; a second coordinate position determining step (S21) of, when it is determined in the duration time determining step that that the duration time is equal to or more than the predetermined time, determining whether or not the coordinate position detected in the coordinate position detecting step is a position corresponding to the designated key pattern; and a second graphic displaying step (S23) of, when it is determined in the second coordinate position determining step that the coordinate position is a position corresponding to the key pattern, displaying the graphic associated with the key pattern at a predetermined position in the input area.

In the sixth exemplary embodiment, the same advantages can be expected as those of the second exemplary embodiment.

A seventh exemplary embodiment is a storage medium according to the fifth exemplary embodiment, wherein the program further causes the processor to perform a valid key setting step (S9) of, when a change of touch-off to touch-on is detected in the touch detecting step, setting the designated key pattern determined in the key pattern designation determining step as a valid key, wherein when it is determined in the first coordinate position determining step that the coordinate position corresponds to the key pattern set as the valid key, in the first graphic displaying step, the graphic associated with the key pattern is displayed at a predetermined position in the input area, and when it is determined in the first coordinate position determining step that the coordinate position is an arbitrary position within the input area, in the first graphic displaying step, the graphic associated with the key pattern is displayed at the arbitrary position, and the program causes the processor to further perform a canceling step (S35) of, when a change of the touch-on to touch-off is detected in the touch detecting step, canceling the setting of the valid key.

In the seventh exemplary embodiment, the same advantages can be expected as those of the third exemplary embodiment.

An eighth exemplary embodiment is a storage medium according to any one of the fifth through seventh exemplary embodiments, wherein the program further causes the processor to perform a predetermined position setting step (S25, S33) of, when the character graphic associated with the key pattern is displayed in the first graphic displaying step or the second graphic displaying step, setting the position related to the display position of the character graphic as the predetermined position.

In the eighth exemplary embodiment, the same advantages can be expected as those of the fourth exemplary embodiment.

A ninth exemplary embodiment is an information input method for an information processing apparatus (10) comprising a display (14), a touch panel (22) provided in relation to the display, and a processor (42), which includes the following steps of: a displaying step (S1) of causing the display to display a plurality of key patterns and an input area; a touch detecting step (S3, S15, S27) of detecting a touch-on to or a touch-off from to the touch panel at predetermined time intervals; a coordinate position detecting step (S5, S17) of detecting a coordinate position at a time when the touch-on is detected in the touch detecting step; a key pattern designation determining step (S7) of, when a change of state from touch-off to touch-on is detected in the touch detecting step, determining whether or not the coordinate position detected in the coordinate position detecting step designates any of the plurality of key patterns; a first coordinate position determining step (S29, S39) of, after it is determined in the key pattern designation determining step that some of the key patterns is designated, in response to the detection of a change to touch-off in the touch detecting step, determining whether the coordinate position detected in the coordinate position detecting step immediately before the change to touch-off is a position corresponding to the key pattern or an arbitrary position within the input area; and a first graphic displaying step of, when it is determined in the first coordinate position determining step that the coordinate position is a position corresponding to the key pattern, displaying a graphic associated with the key pattern at the predetermined position in the input area, and, when it is determined in the first coordinate position determining step that the coordinate position is an arbitrary position in the input area, displaying the graphic associated with the key pattern at the arbitrary position.

In the ninth exemplary embodiment, the same advantages can be expected as those of the first through the fifth exemplary embodiments.

According to certain exemplary embodiments, by touching a key pattern through a touch-on operation and moving the stick or the like to an arbitrary position in the input area while keeping it in the touch-on state, it is possible to drag the character graphic for the key pattern into the arbitrary position. Accordingly, the user can freely select the input position in the input area, i.e., the display position of the character graphic associated with the key pattern.

The above described objects and other objects, features, aspects, and advantages of the exemplary embodiments will become more apparent from the following detailed description of the exemplary embodiments when taken in conjunction with the accompanying drawings.

BRIEF DESCRIPTION OF THE DRAWINGS

FIG. 7 is an illustrative view showing a first character input screen example;

FIG. 8 is an illustrative view showing a second character input screen example;

DETAILED DESCRIPTION

Figure 1:
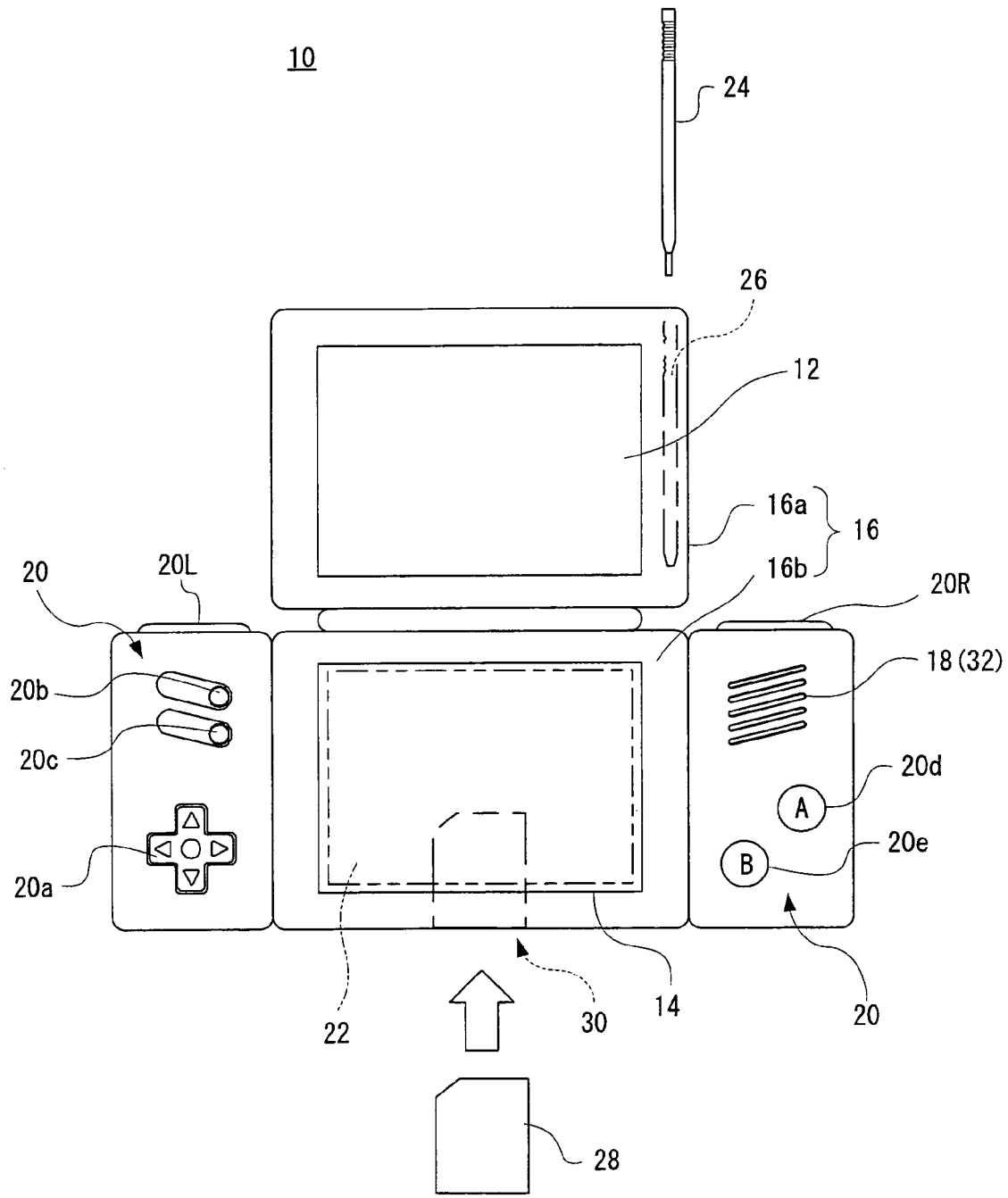
FIG. 1 is an illustrative view showing one example of a game apparatus of an exemplary embodiment.

Referring to FIG. 1, a game apparatus 10 of one exemplary embodiment functions as an information processing apparatus. The game apparatus 10 includes a first liquid crystal display (LCD) 12 and a second LCD 14. The LCD 12 and the LCD 14 are provided on a housing 16 so as to be arranged in a predetermined position. In this exemplary embodiment, the housing 16 consists of an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although the LCD is utilized as display in this embodiment, an EL (Electronic Luminescence) display, a plasma display, etc. may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound release hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotated to fold such that the display surface of the LCD 12 and the display surface of the LCD 14 are face to face with each other, it is possible to prevent the display surface of the LCD 12 and the display surface of the LCD 14 from being damaged such as a flaw, etc. It is noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion, and lie of each side of the connected portion with the upper housing 16a.

The direction indicating switch 20a functions as digital joystick, and is utilized for indicating a moving direction of a user character (or user object) to be operated by a user, indicating a moving direction of a cursor and so forth by operating one of four depression portions. The start switch 20b is formed by a push button, and is utilized for starting (restarting), temporarily stopping (pausing) a game, and so forth. The select switch 20c is formed by the push button, and utilized for selecting a game mode, etc.

The action switch 20d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button is formed by the push button, and is utilized for changing a game mode selected by the select switch 20c, canceling an action determined by the A button 20d, and so forth.

The action switch (left depression button) 20L and the action switch (right depression button) 20R are formed by the push button, and the left depression button (L button) 20L and the right depression button (R button) 20R can perform the same operation as the A button 20d and the B button 20e, and also function as subsidiary of the A button 20d and the B button 20e.

The LCD 14 is provided with a touch panel 22 on a top surface. As the touch panel 22, any one of resistive film type, optical (infrared) type and electrostatic capacity coupling type can be employed, for example.

In response to an operation by depressing, stroking, touching (hereinafter referred to simply as "depressing") with a stick 24, a pen (stylus pen), or a finger (hereinafter referred to as "stick 24 or the like" in some cases) on a top surface of the touch panel 22, the touch panel 22 detects coordinates of a operating position of the stick 24 or the like and outputs coordinates data corresponding to the detected coordinates. Besides, a touch of the stick 24 or the like by the user on the touch panel 22 is called "touch-on", and moving of the stick 24 or the like off the touch panel 22 is referred to as "touch-off".

It is noted that in this exemplary embodiment, a resolution of the display surface of the LCD 14 is 256 dots×192 dots (this is true or roughly true for the LCD 12), and a detection accuracy of a detection surface of the touch panel 22 is also rendered 256 dots×192 dots in correspondence to the resolution of the display surface. However, detection accuracy of the touch panel 22 may be lower than the resolution of the display surface, or higher than it.

In playing a game, the LCD 12 and the LCD 14 display different game screens. In a racing game, for example, one LCD may display a screen of a sight seen from the viewpoint of a driver's seat, and the other LCD may display a screen of the entire race (course). Also, in an RPG, one LCD may display characters such as maps and user characters, and the other may display items possessed by user characters. Moreover, one LCD (the LCD 12 in this exemplary embodiment) may display a play screen for a game, and the other LCD (the LCD 14 in this exemplary embodiment) may display a game screen (operating screen) containing graphic information, icons, etc. for performing the game. Furthermore, by using the LCD 12 and the LCD 14 together as one screen, it is possible to display an enormous monster (enemy character) to be defeated by a user character.

Accordingly, by operating the touch panel 22 with the stick 24 or the like, the user can specify a character image of user character, enemy character, item character, graphic information, icon or the like to be displayed on the screen of the LCD 14, and select a command. Also, the user can change an orientation of a virtual camera (viewpoint) provided in a three-dimensional game space and designate a scrolling (gradually moving screen display) direction of a game screen (map).

Besides, depending on the kind of the game, it is possible to perform other various input designations. Examples are to select or operate an icon displayed on the LCD 14 and to give a coordinate input instruction.

Thus, the game apparatus 10 has the LCD 12 and the LCD 14 as display portion of two screens, and the touch panel 22 is provided on an upper surface of any one of them (LCD 14 in this exemplary embodiment). Thus, the game apparatus 10 has the two screens (12, 14) and two systems of the operating portions (20, 22).

Furthermore, in this exemplary embodiment, the stick 24 can be inserted into a housing portion (housing slot) 26 provided in proximity to a side surface (right side surface) of the upper housing 16a, for example, and taken out therefrom as necessary. It is noted that in a case of not preparing the stick 24, it is not necessary to provide the housing portion 26.

Also, the game apparatus 10 includes a memory card (or cartridge) 28, and the memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

It is noted that although not illustrated in FIG. 1, a speaker 32 (see FIG. 2) is provided at a position corresponding to the sound release hole 18 in the lower housing 16b.

Furthermore although omitted in FIG. 1, for example, a battery accommodating box is provided on a rear surface of the lower housing 16b, and a power switch, a volume switch, an external expansion connector, an earphone jack, etc. are provided on a bottom surface of the lower housing 16b.

Figure 2:
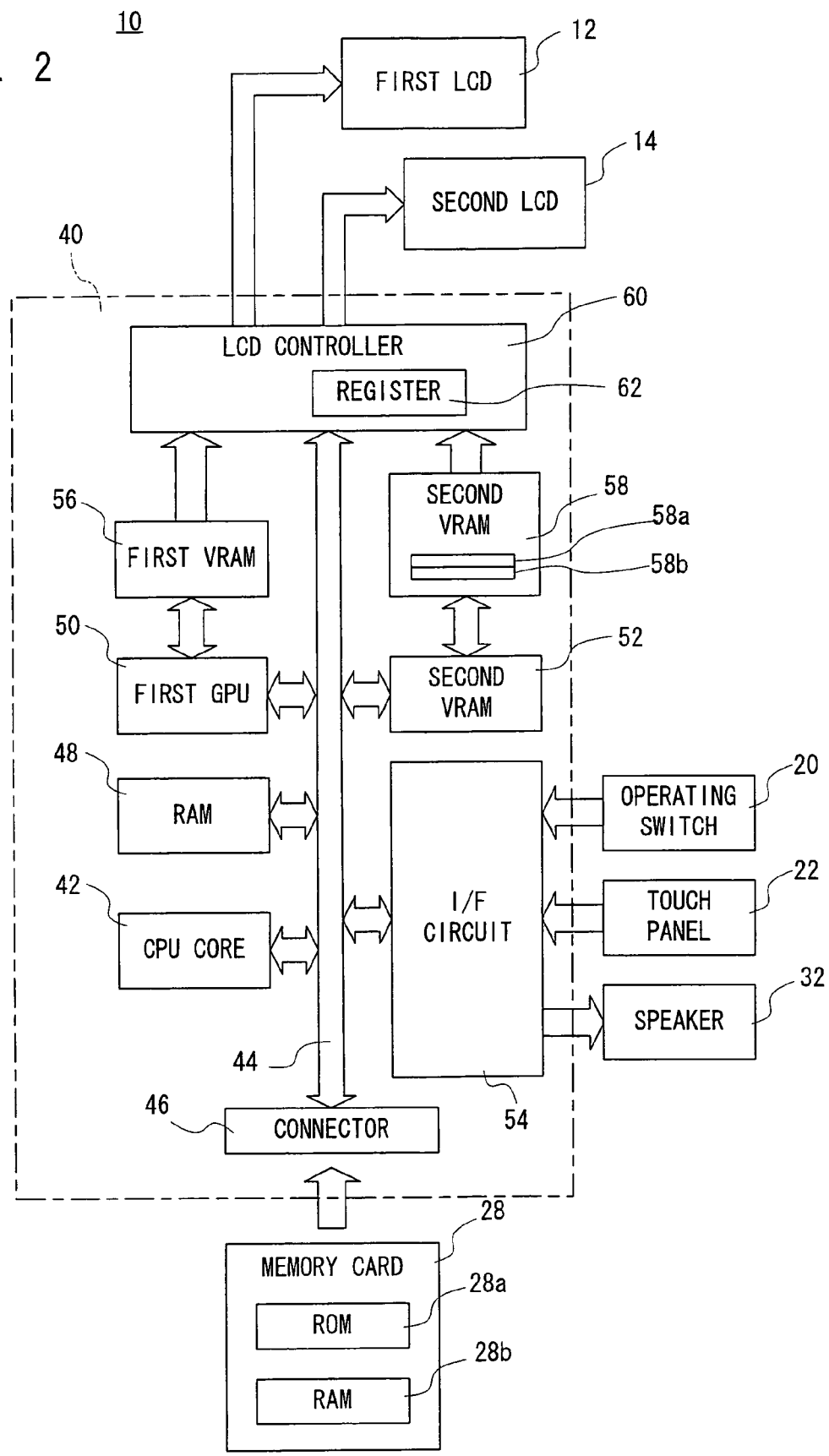
FIG. 2 is a block diagram showing electrical structure of the game apparatus shown in FIG. 1.

FIG. 2 is a block diagram showing an electrical configuration of the game apparatus 10. Referring to FIG. 2, the game apparatus 10 includes an electronic circuit board 40, and on the electronic circuit board 40, a circuit component such as a CPU core 42, etc. are mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28a and a RAM 28b, and although illustration is omitted, the ROM 28a and the RAM 28b are connected with each other via a bus, and also connected with a connector (not shown) to be connected with the connector 46. Accordingly, the CPU core 42 gains access to the ROM 28a and the RAM 28b as described above.

The ROM 28a stores in advance a game program for a game (virtual game) to be executed by the game apparatus 10, image data (character image, background image, item image, icon (button) image, etc.), data of sound (music) necessary for the game (sound data), etc. The RAM (backup RAM) 28b stores (saves) proceeding data and result data of the game.

Besides, the game apparatus 10 makes it possible to play a game whose contents are fixed by the memory card 28, and also can be used for purposes other than game playing. For example, by displaying a keyboard or key patterns on the second LCD 14 and touching (operating) the touch panel 22 above the keyboard to specify or designate the key patterns, it is possible to make the game apparatus 10 function as an information processing apparatus for inputting characters, numbers, symbols, etc. (hereinafter referred to as collectively "characters" in some cases) specified or designated by the keyboard or the key patterns. In this case, instead of a game program, an information processing program is stored in the ROM 28a.

Also, in using the game apparatus 10 as an information processing apparatus as stated above, images to be displayed includes images of the above mentioned keyboard or key patterns, images of character graphics for the input characters, and images of characters hand-written in the touch panel 22 by means of the stick 24 or the like.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. The CPU core 42 executes a game process while storing data (game data and flag data) temporarily generated in correspondence with a progress of the game in the RAM 48. This CPU core 42 functions as a processor, but, in some cases, the above mentioned GPUs 50 and 52 are also called a processor or form a part of the processor.

It is noted that such the game program, the image data, the sound data, etc. are loaded from the ROM 28a entirely at a time, or partially and sequentially as necessary so as to be stored (loaded) into the RAM 48.

Additionally, the ROM 28a of the memory card 28 stores some programs for applications other than games, and image data required for execution of those applications. Also, the ROM 28a may store sound (music) data where necessary. In this case, the game apparatus 10 executes those applications.

Each of the GPU 50 and the GPU 52 forms a part of a rendering means, is constructed by a single chip ASIC, for example, and receives a graphics command (image generating command) from the CPU core 42 to generate image data according to the graphics command. It is noted that the CPU core 42 applies to each of the GPU 50 and the GPU 52 an image generating program (included in the game program) required to generate the image data in addition to the graphics command.

It is noted that each of the GPU 50 and the GPU 52 gains access to the RAM 48 to fetch data (image data: data such as polygon, texture, etc.) required to execute the construction command by the GPU 50 and the GPU 52.

Furthermore, the GPU 50 is connected with a first video RAM (hereinafter, referred to as "VRAM") 56, and the GPU 52 is connected with a second VRAM 58. The GPU 50 and the GPU 52 access the first VRAM 56 and the second VRAM 58, respectively, to obtain data required for execution of the image generating command by the GPU 50 and the GPU 52 (image data: character data, texture data, etc.).

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. The LCD controller 60 outputs the image data generated by the GPU 50 to the LCD 12, and outputs the game image data generated by the GPU 52 to the LCD 14 in a case that the data value of the register 62 is "0". Furthermore, the LCD controller 60 outputs the game image data generated by the GPU 50 to the LCD 14, and outputs the game image data generated by the GPU 52 to the LCD 12 in a case that the data value of the register 62 is "1".

Besides, the LCD controller 60 reads image data directly from the VRAM 56 and the VRAM 58, and also reads image data from the VRAM 56 and the VRAM 58 via the GPU 50 and the GPU 52.

In this exemplary embodiment, a text display layer 58 and an image display layer 58a are formed in the VRAM 58. The text display layer 58a is a storage area for providing text display in an input area 68 (described later) using the font data read from the code conversion table. The image display layer 58b is a storage area for displaying the font data read from a code conversion table and other image data (for images handwritten with the stick 24 or the like into the touch panel 22, etc.) as bitmap images in the input area 68.

The I/F circuit 54 is connected with the operating switch 20, the touch panel 22 and the speaker 32. Here, the operating switch 20 is the above-described switches 20a, 20b, 20c, 20d, 20e, 20L and 20R, and in response to an operation of the operating switch 20, a corresponding operation signal (operation data) is input to the CPU core 42 via the I/F circuit 54. Furthermore, the coordinates data from the touch panel 22 is input to the CPU core 42 via the I/F circuit 54. In addition, the CPU core 42 reads the sound data necessary for the game such as game music (BGM), sound effects and voices of game characters (onomatopoeic sound), etc. from the RAM 48, and outputs it from the speaker 32 via the I/F circuit 54.

Figure 3:
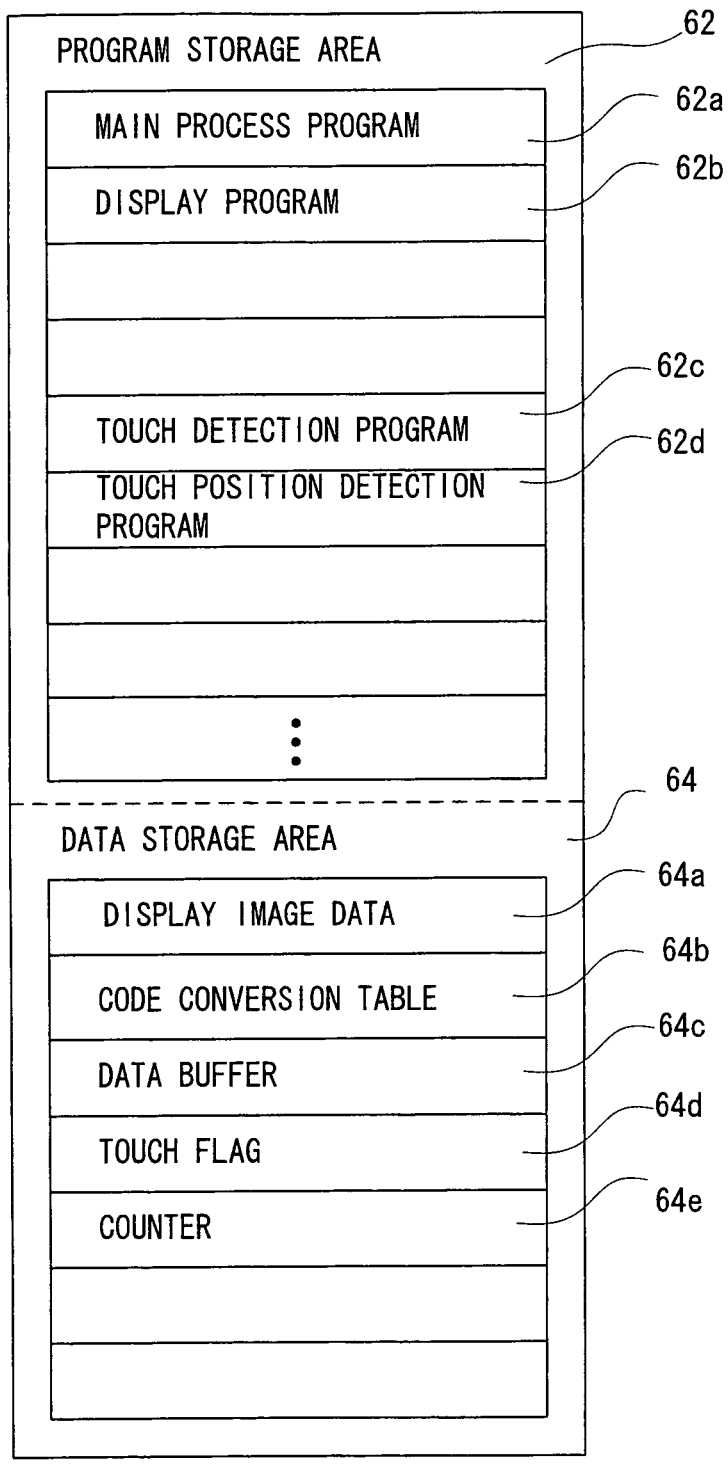
FIG. 3 is an illustrative view showing one example of a memory map of a RAM provided in the game apparatus shown in FIG. 2.

FIG. 3 illustrates a memory map of the RAM 48 of FIG. 2. Formed in the RAM 48 are a program storage area 62 for storing a program downloaded from the ROM 28a and a data storage area 64 for storing data downloaded from the same ROM 28a.

The program storage area 62 includes a main process program storage area 62a for storing a main process program, a display program storage area 62b for storing a display program, a touch detection program storage area 62c for storing a touch detection program, and a touch position detection program storage area 62d for storing a touch position detection program.

Figure 4:
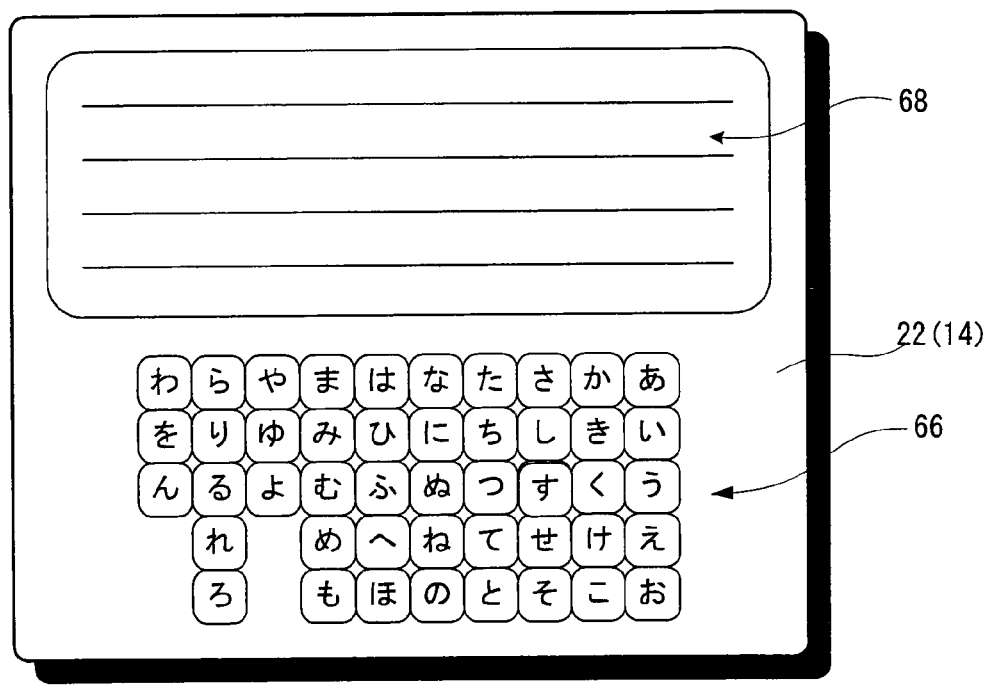
FIG. 4 is an illustrative view showing one example of a key input image displayed on a second LCD of the game apparatus shown in FIG. 1.

The main process program is a program for controlling main process operations described later in detail by reference to FIG. 5 and FIG. 6, in particular, a character input operation. The display program is a program for displaying on the second LCD 14 a character input screen as shown in FIG. 4, and displaying graphics for characters, symbols and numbers input by operating the touch panel 22 with use of the input screen and displaying an image drawn by means of the stick 24 or the like. The touch detection program is a program for detecting whether the stick 24 or the like is touching the panel 22 or not (touch-on or touch-off). The touch position detection program is a program for detecting the position (coordinate position) on the touch panel 22, that is, on the second LCD 14 in which the stick 24 or the like has touched.

The display image data storage area 64a in the data storage area 64 stores image data for the input screen as shown in FIG. 4, for example. The code conversion table 64b is a table for converting a character code for a character associated with the key pattern designated or specified (touched) by the stick 24 or the like into dot data (font data or display data), such as a character generator. When the character code for the designated key is input, the dot data (font data) of graphic for the character or symbol indicated by the character code is output.

Figure 5:
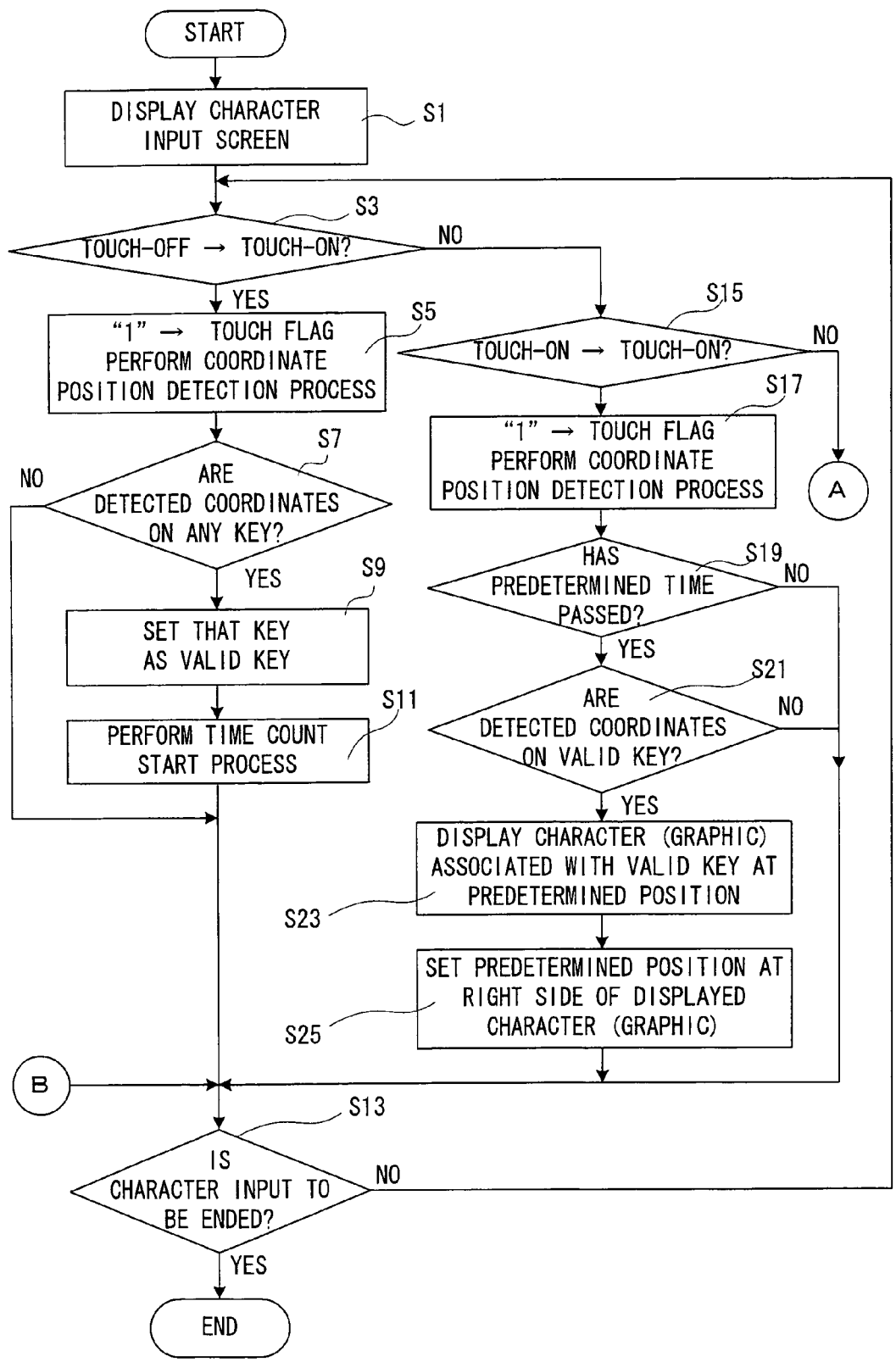
FIG. 5 is a flowchart showing a main process operation of a CPU core shown in FIG. 2.

The data buffer 64c is a buffer register for temporarily storing the coordinate position data detected by the above mentioned touch position detection program 62d and the key code for the key (FIG. 5: S9) set as a valid key (described later).

The touch flag 64d is a flag for storing the touch-on state (the state in which the stick 24 or the like is touching the touch panel 22) or the touch-off state (the state in which the stick 24 or the like is not touching the touch panel 22) as "1" or "0".

Also, the counter 64e works as time measuring means for counting or measuring an elapsed time. In the exemplary embodiments, the time measuring means measures a duration time during which the stick 24 or the like touches the touch panel 22.

Here, referring to FIG. 4, a description is given as to a character input image (screen) displayed on the second LCD 14 in the case of inputting characters by means of the LCD 14 and the touch panel 22. The character input image (screen) is an image that is displayed by the second GPU 52 on the second LCD 14 under control by the CPU core 42 shown in FIG. 2. This character input screen includes a keyboard or a key pattern image 66. Formed above the key pattern image 66 is an input area 68 for displaying input characters. In addition, ruled lines displayed in the input area 68, for example, are also a component of the character input image.

Besides, the example of FIG. 4 shows only "hiragana (Japanese syllabary characters)" as the key patterns. In addition to that, however, it is also possible to display and input other arbitrary characters such as katakana (Japanese phonetic characters), numbers, symbols, alphabet, etc. The kind of key patterns can be changed by adding the pattern or image of a kind selection button (not illustrated) in the character input image displayed on the LCD 14 and making the user select the button by a touch operation.

Moreover, certain exemplary embodiments can be also used for inputting messages, pictures, graphics, etc. in addition to characters. Thus the flowchart of FIG. 5 and FIG. 6 describes in general an information input program and method.

Figure 6:
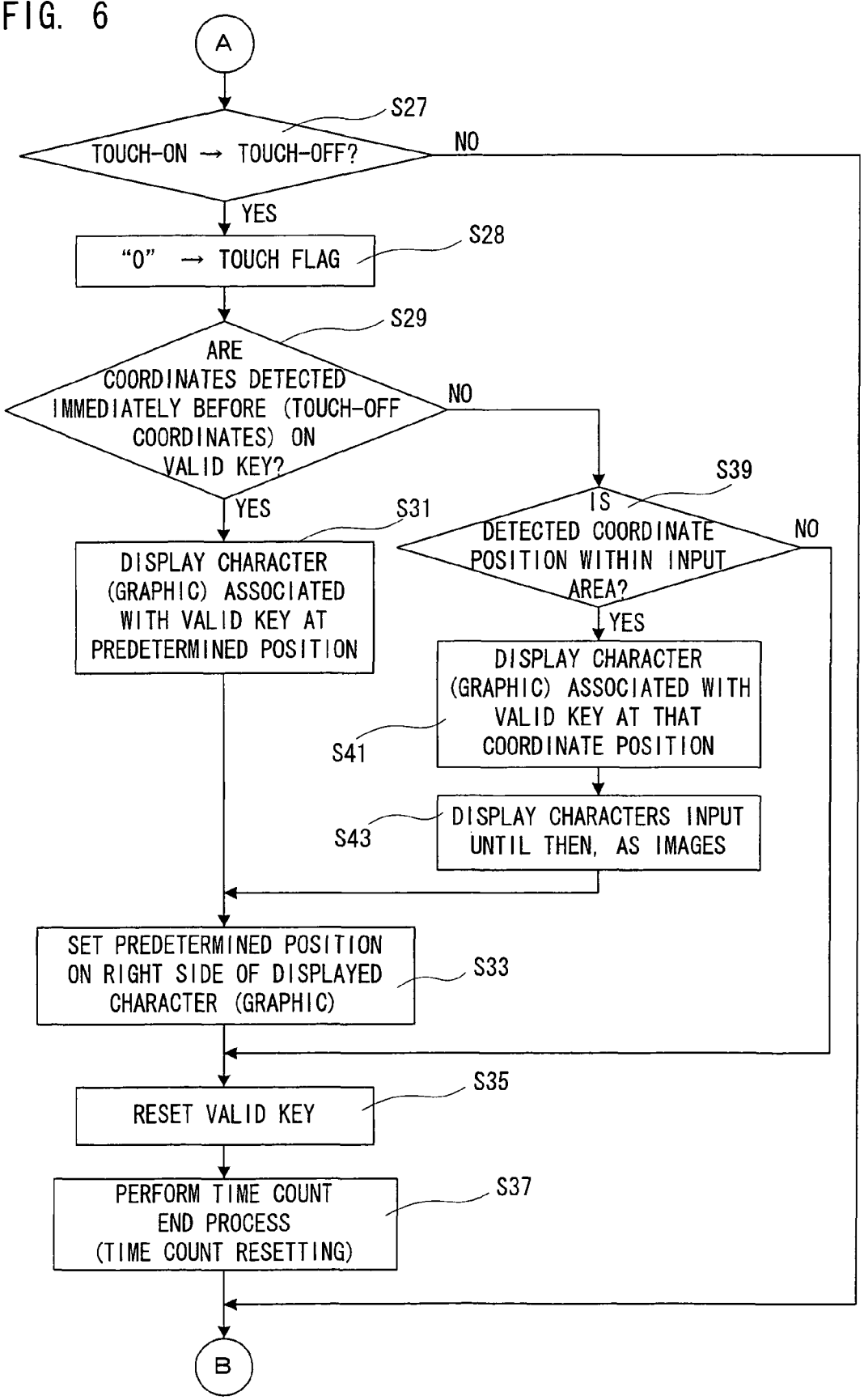
FIG. 6 is a flowchart showing an operation continued from the main process operation of FIG. 5.

More specifically, a character input operation is performed according to the flowchart shown in FIG. 5 and FIG. 6. For the outline of the operation, the CPU core 42 displays the input screen of FIG. 4 in the case of making the game apparatus 10 (FIG. 1) function as an information processing apparatus. Under the condition, the user can input a desired character into the input area 68 by touching the touch panel 22 at a position where the key pattern indicative of the character is displayed.

For a more detailed description, in a first step S1 of FIG. 5, the CPU core 42 instructs the second GPU 52 to display the character input image shown in FIG. 4 on the second LCD 14. At that time, the GPU 52 operates according to the display program 62b in the program storage area 62, and displays the character input screen by using the display image data 64a (image data of the key patterns 66 and image data of ruled lines in the input area 68) stored in the data storage area 64 of the RAM 48 shown in FIG. 3. In this manner, the character input image (screen) of FIG. 4 is displayed, which allows the user to can input characters.

In step S3, the CPU core 42 uses the touch detection program 62c (FIG. 3) to determine whether or not the stick 24 or the like is touching the touch panel 22, that is, whether or not the touch-off state is changed from the touch-on state. In addition, this main process routine is repeatedly performed after each predetermined time. Therefore, step S3 functions as touch detecting means for detecting the presence or absence of a touch on the panel 22 after each predetermined time, together with steps S15 and S27 described later.

After the change of state from touch-off to touch-on was detected in step S3, the CPU core 42 writes "1" into a touch flag 64d, and also uses the touch position detection program 62d (FIG. 3) to detect the coordinate position on the touch panel 22 in which the stick 24 or the like touched, in succeeding step S5. Then, the coordinate data of the detected coordinate position is temporarily stored in the buffer 64c of FIG. 3.

In succeeding step S7, the CPU core 42 determines whether or not the detected coordinate position (touch position) corresponds to the coordinates on any one of the key patterns 66 shown in FIG. 4, for example. That is, it is determined in step S7 whether or not the user has touched on any one of the key patterns. If the user has touched on any one of the key patterns, "YES" is determined in step S7. After that, in step S9 that functions as a valid key setting means, the CPU core 42 sets the key of that pattern (the key specified by the user) as a valid key. Code data for the key set as a valid key is temporarily held in the data buffer 64c (FIG. 3).

Then, in a next step S11, the CPU core 42 triggers the counter 64e to start time count. The counter 64f is used to determine whether or not the touch-on state has continued for a predetermined time.

After starting the time count start process in step S11, the CPU core 42 determines in step S13 whether the character input is completed or not. If "YES", the process is directly terminated. If "NO", the process is returned to previous step S3 to repeatedly perform the main process program.

If no change of state from touch-off to touch-on was detected in previous step S3, that is, if "NO" is determined in step S3, the CPU core 42 uses the same touch detection program 62c in next step S15 to determine whether the touch-on state is continuing or not. That is, if a touch-on is detected this time and a touch-on was also detected at the previous time (the touch flag 64d then indicated "1"), it is determined that the touch-on is continuing.

If it is determined that the touch-on is continuing, the CPU core 42, in step S17, sets the touch flag 64d again as in the case of the previous step S5, and also detects the coordinate position on the touch panel 22 at which the stick 24 or the like touches and stores the coordinate data in the buffer 64c. Then, in next step S19 (the duration time determining means), it is determined whether or not a predetermined time has passed by watching the timer counter 46e (FIG. 3).

If "NO" in step S19, the process proceeds to step S13. If "YES", that is, if the touch-on has continued for the predetermined time or more, the CPU core 42 determines in succeeding step S21 whether or not the touch position coordinates detected in step S17 functioning as second coordinate position determining means correspond to the key pattern for the key set as a valid key in step S9. If "YES" is determined in step S21, this means that the same key pattern is continuously touched for the predetermined time or more. Under this situation, the CPU core 42 then displays in a predetermined position the graphic of a character associated with the valid key, in succeeding step S23 functioning as second graphic displaying means. At this time, more specifically, by referring to the code conversion table 64b (FIG. 3) with the key code of the valid key, the CPU core 42 obtains display data (font data) for the character identified by the key code. Then, the CPU core 42 instructs the second GPU 52 (FIG. 2) to write the font data into the text display layer 58a of the second VRAM 58. Accordingly, the character graphic for the character specified by the key pattern is displayed in text form in the input area 68 formed on the LCD 14. In the following cases of displaying a character graphic in text form, font data is read from the code conversion table 64b in the same manner.

Then, in next step S25, the CPU core 42 sets a next display position (predetermined position) on the immediately right (right side) of the character graphic displayed in such a manner.

Besides, in this exemplary embodiment, a cursor is not used to show the user clearly the position (predetermined position) at which a next input character is to be displayed. Thus, it is somewhat difficult to find the "predetermined position", and thus a square is drawn by dotted lines in FIG. 7, FIG. 8 and FIG. 9 in order to make it easy to locate the position. However, whether or not to display the cursor can be decided arbitrarily. It is also possible to show the user the next character input position by means of a cursor symbol that is generally used in information processing apparatuses such as personal computers.

Referring to FIG. 7, FIG. 7 illustrates an example of input screen in which the key pattern for the hiragana character "す" ("su") included in the keyboard image 66 is continuously touched for the predetermined time or more. As shown in FIG. 7 (A), if a position in the touch panel 22 corresponding to a range of the position of the key pattern for the character "す" ("su") is touched by the touch pen 24 and that state is continued for the predetermined time or more as shown in FIG. 7 (B), the character specified by the key pattern, in this case, the character graphic for "す" ("su") is displayed in text form at the "predetermined position" in the character input area 68 in step S23. In the example of FIG. 7 (B), the character "す" ("su") is input 16 consecutive times. Then, in step S25, as shown in FIG. 7 (B), a predetermined position is set for displaying the next input character graphic on the right side of the lastly input character, the 16th character "す" ("su") in the example of FIG. 7. The example of FIG. 7 indicates the case where the one and same character is continuously input, but, in actuality, such character input is unusual. The operation of inputting different characters one by one will be described later.

After the predetermined position for displaying the next input character was set in step S25, the process moves to step S13.

If "NO" is determined in step S15 of FIG. 5, that is, if the CPU core 42 determined that this is not a change of state from touch-off to touch-on or is not the continuance of touch-on, the process goes to step S27 of FIG. 6.

In step S27 of FIG. 6, the CPU determines by the touch detection program 62c whether or not a change of state from touch-on to touch-off has taken place, that is, whether or not the user has moved the stick 24 or the like off the touch panel 22. If it is determined that a touch-off is detected this time and a touch-on was detected at the previous time (the touch flag 64d then indicated "1"), "YES" is determined in step S27. If "NO", the process returns to step S13 (FIG. 5).

If a change of state from touch-on to touch-off was detected in step S27, the CPU core 42 writes "0" into the touch flag 64d in next step S28, and detects the coordinates on the touch panel 22 at which the stick 24 or the like touched until immediately before the touch-off. In this case, the touch-off coordinates are coordinates saved in the data buffer 64c at the previous touch-on time. Then, in step S29, the CPU core 42 refers to the buffer 64c to determine whether or not the touch-off coordinates are at the position corresponding to the valid key (step S9) (the first coordinate position determining means).

If "YES" is determined in step S29, that is, if some key pattern included in the keyboard graphic 66 was touched by the stick 24 or the like for a shorter time than the predetermined time and then the stick 24 was moved off, the CPU core 42 displays the character graphic associated with the key (valid key) at a predetermined position in next step S31 constituting the first graphic displaying means, and sets the "predetermined position" on the right side of the character graphic in step S33. At this time as well, the CPU core 42 displays at the predetermined position the character graphic for the character in text form identified by the valid key, by reading the font data for the character from the code conversion table (font table) 64*b* and writing it into the text display layer 58*a* of the VRAM 58.

Referring to FIG. 8, FIG. 8 illustrates an example of input screen in which the key pattern for the character "す" ("su") included in the keyboard image 66 is touched for less than the predetermined time and then released. As shown in FIG. 8 (A), when a position in the touch panel 22 corresponding to a range of the position of the key pattern for the character "す" ("su") is touched and, immediately after that, the touch is canceled as shown in FIG. 8 (B), the character specified by the key pattern, the character "す" ("su") in this case, is displayed only one time in the "predetermined position" at the character input area 68 in step S31. Then, in step S33, the predetermined position for displaying the next input character graphic is set on the right side of the character. Therefore, after that, when the key pattern for another character is touched for a short time, the character graphic for the "other character" is displayed at the predetermined position of FIG. 8 (B). The input method shown in FIG. 8 is a general input method by which different characters are sequentially input.

After the next input character display position (predetermined position) was set in step S33, the setting of the valid key set in step S9 is canceled and the counter 64*e* is reset to end the time count operation, in step S35 functioning as canceling means.

A novel input method as a feature of this exemplary embodiment is described below.

If "NO" was determined in step S29 of FIG. 6, that is, if the touch-off coordinates are not in the position corresponding to the valid key, the CPU core 42 detects the touch-off coordinates in step S39 constituting the first coordinate position determining means, as in case of the step S29, and determines whether or not the touch-off coordinates are in an arbitrary position within the input area 68. If "NO", the process moves to step S35.

If "YES" was determined in step S39, that is, if the user has touched the touch panel 22 by stick 24 or the like at a position associated with any of the key patterns included in the keyboard image 66, and then has moved the stick 24 or the like to the input area 68 while keeping it in the touch-on state, the CPU core 42 displays the character graphic associated with the valid key at the time at that position (the touch-off coordinates) in the input area 68, in succeeding step S41 that functions as first graphic displaying means. That is, the CPU core 42 displays the character graphic for the character specified by the key pattern in text form, by reading the font data for the character from the code conversion table (font table) 64*b* and writing it into the text display layer 58*a* of the VRAM 58.

Then, the process goes to step S33, and the CPU core 42 displays the character graphic at the touch-off coordinate position and sets the right side of the character graphic as next input character display position (predetermined position).

Figure 9:
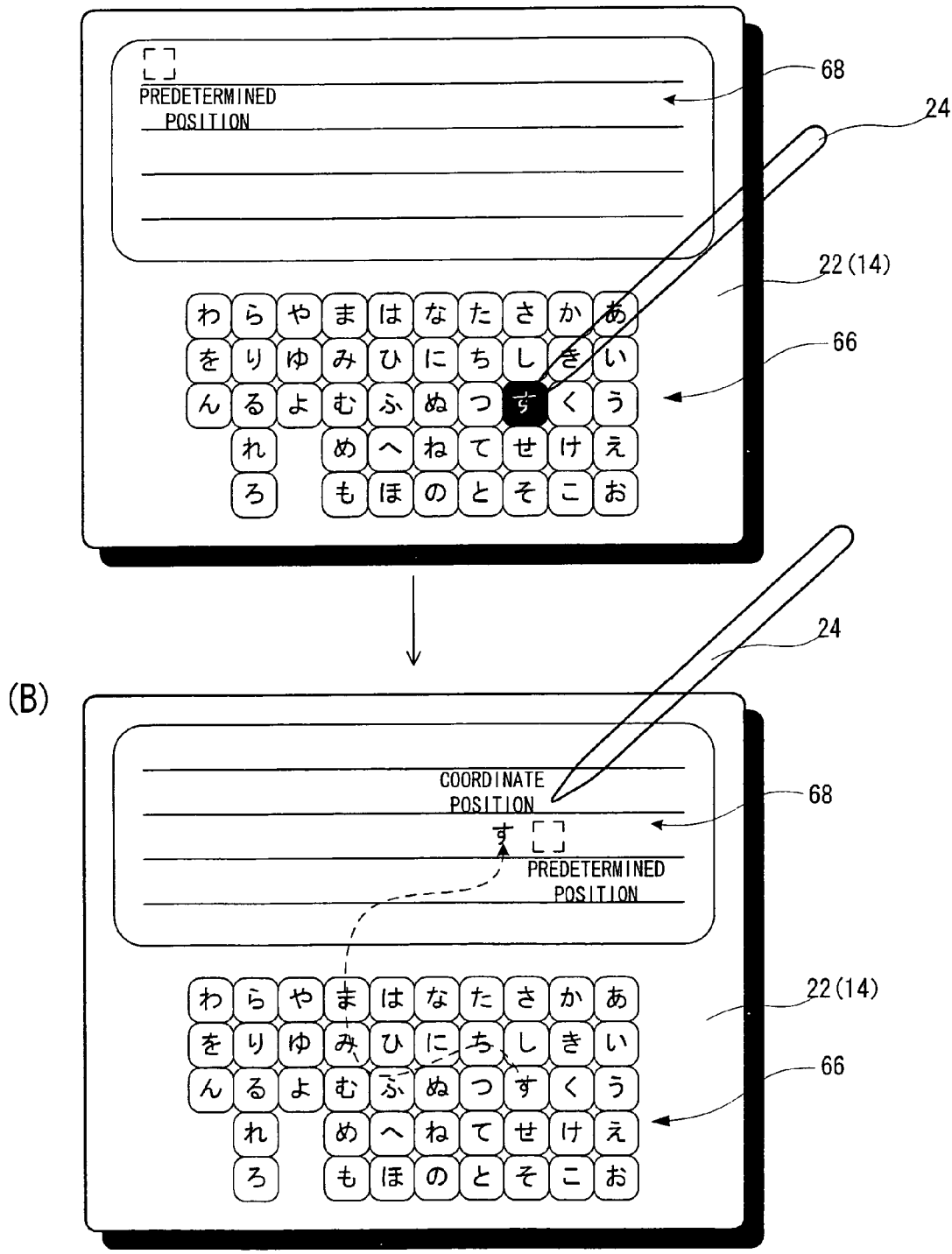
FIG. 9 is an illustrative view showing a third character input screen example.

Referring to FIG. 9, FIG. 9 illustrates an example of input screen in which the key pattern for the character "す" ("su") included in the keyboard image 66 is touched, the stick 24 or the like is slid and moved to the input area 68 as it is in the touch state, and then the touch is canceled in the input area 68. When the touch panel 22 is touched by the touch pen 24 at a position corresponding to a range of the position of the key pattern for the character "す" ("su") as shown in FIG. 9 (A) and the touch pen 24 is slid and moved into the input area 68 as shown in FIG. 9 (B), the character specified by the key pattern, the character graphic for the character "す" ("su") in this case, is displayed in text form at the position corresponding to the touch-off coordinates in the character input area 68 in step S41. That is, by touching the key pattern 66 and moving the stick 24 or the like to the input area 68 while keeping it in the touch state, the character specified by the key pattern can be "dragged" into the input area 68. Consequently, according to this exemplary embodiment, by using the "dragging" technique, it is possible to input (display) a character indicated by a key pattern at an arbitrary position in the input area 68. Following the dragged character, a character graphic for a character input without using the dragging technique is displayed on the right side of the dragged character. That is, the input position is changed each time dragging is performed, and the right side of the dragged character is set as normal input position.

Besides, in the exemplary embodiment, if the character input position is changed by a dragging operation as shown in FIG. 9, the character graphics for the characters input until then are displayed as images in step S43. That is, each time the character input position is changed, the character graphics input until immediately before that are converted into image data (bitmap data). More specifically, in step S43, the CPU core 42 instructs the second GPU 52 to transfer the font data (for text display) stored in the text display layer 58*a* of the second VRAM 58 to the image display layer 58*b* of the same VRAM 58. The image display layer 58*b* is for display of an image on the LCD 14 in the bitmap format. Therefore, the text display before that is changed to the image display at this time. Thus, after that, it is possible to erase the character graphics changed into image display (the character graphics stored in the image display layer 58*b*), as in the case of other images (including images hand-written by means of the stick 24 or the like), by setting the stick 24 or the like to an "eraser" mode and tracing them with the stick 24 or the like. On the other hand, it is impossible to erase the character graphics input after the change of the character input position (the character graphics stored in the text display layer 58*a*) by the above mentioned stick operation in the "eraser" mode. These graphics can be erased one by one from the lastly input character by pointing at a "backspace" key or the like (not illustrated) displayed in the key patterns 66 through a touch operation.

As described above, according to the input system of this exemplary embodiment, while characters are input into the predetermined sequential positions by the method of FIG. 7 or FIG. 8, these character graphics are displayed in text form. When the character input position is changed so as not to be sequential by the method shown in FIG. 9, the characters input until then are displayed in graphic form. However, this is just one exemplary embodiment.

Figure 10:
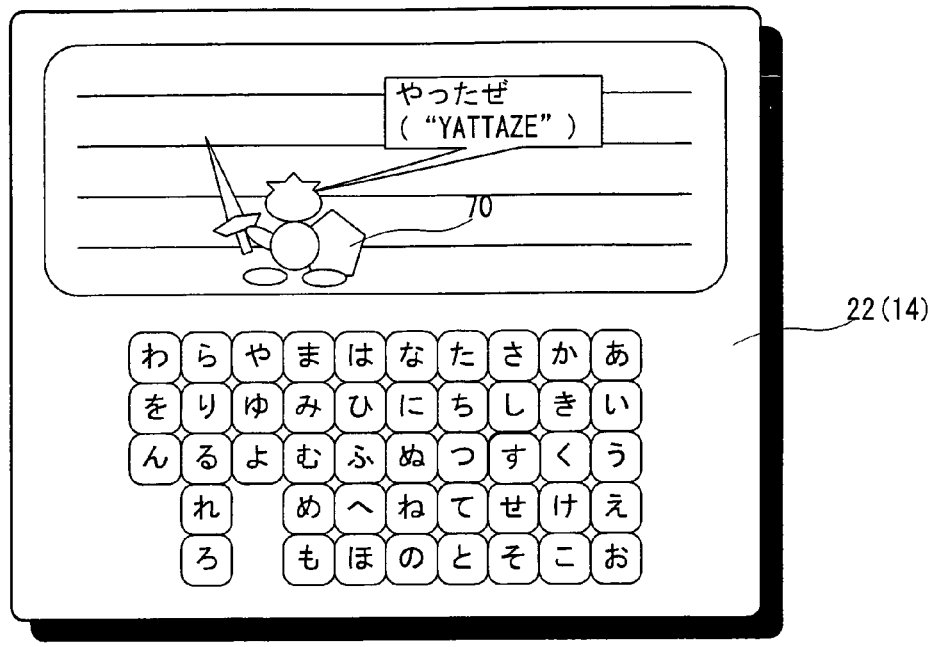
FIG. 10 is an illustrative view showing one form of using an input method shown in FIG. 9.
Figure 11:
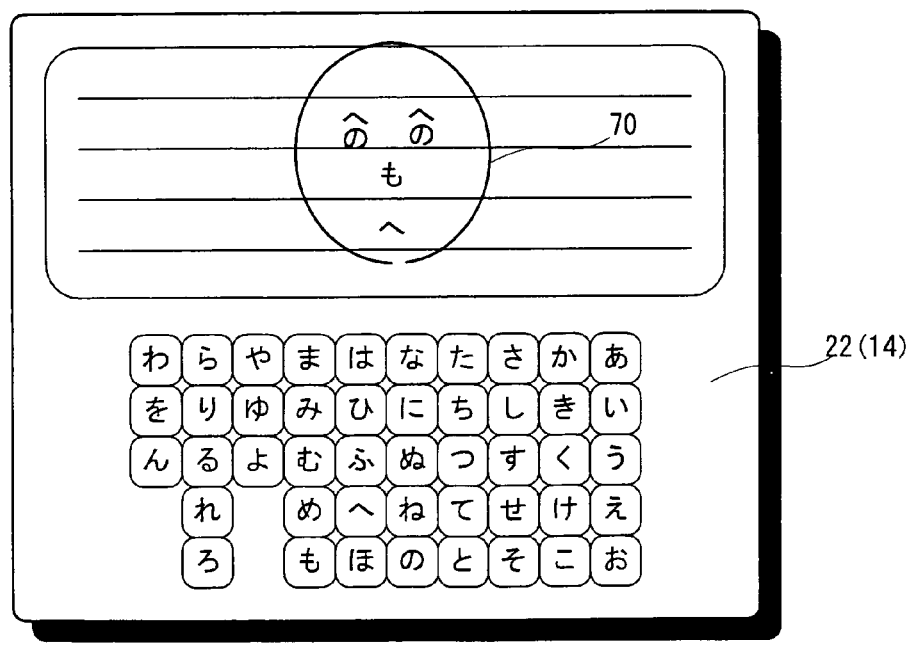
FIG. 11 is an illustrative view showing another pattern of using the input method shown in FIG. 9.

By using this exemplary embodiment that allows the user to arbitrarily change or select or set the character input position as shown in FIG. 9, it is possible to arrange the input character at an arbitrary position as in the case of a dialogue balloon in a cartoon shown in FIG. 10, for example. Moreover, by arranging characters at arbitrary positions, it is possible to draw a picture by the characters, as shown in FIG. 11. In addition to them, many other usage forms are conceivable.

Besides, the line drawings indicated with the reference numeral 70 in FIG. 10 and FIG. 11 may be prepared character images or pictures (images) hand-written by the stick 24 or the like into the touch panel 22, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus comprising:
a display;
a touch panel provided in relation to said display;
a display module configured to display a plurality of key patterns and an input area in said display;
a touch detector that detects a touch-on to or a touch-off from said touch panel at predetermined time intervals;
a coordinate position detector that detects a coordinate position at a time when said touch detector detects said touch-on;
a key pattern designation determining unit that, when said touch detector detects a change of state from touch-off to touch-on, determines whether or not the coordinate position detected by said coordinate position detector designates any of said plurality of key patterns;
a first coordinate position determining unit that, after said key pattern designation determining unit determines that some of the key patterns are designated, in response to the detection of a change to touch-off by said touch detector, determines whether the coordinate position detected by said coordinate position detector immediately before the change to touch-off is either a position corresponding to said key pattern or an arbitrary position within said input area;
a first graphic displaying module that, when said first coordinate position determining unit determines that said coordinate position that is detected by said coordinate position detector immediately before the change from touch-on to touch-off is a position corresponding to said key pattern, displays a graphic associated with the key pattern at a predetermined position in said input area, wherein the predetermined position is updated to a new position associated with the predetermined position as a result of the displaying of the graphic associated with the key pattern; and
a second graphic displaying module that, when said first coordinate position determining unit determines said coordinate position that is detected by said coordinate position detector immediately before the change from touch-on to touch-off is an arbitrary position within said input area, displays the graphic associated with the key pattern at said arbitrary position, wherein the predetermined position is updated to a new position associated with the arbitrary position as a result of the displaying of the graphic associated with the key pattern.

2. An information processing apparatus according to claim 1, further comprising:
a timer that, when said key pattern designation determining unit determines that some of the key patterns are designated, counts a time during which said touch-on state continues;
a duration time determining unit that determines whether or not the duration time counted by said timer is equal to or more than a predetermined time;
a second coordinate position determining unit that, when said duration time determining unit determines that said duration time is equal to or more than said predetermined time, determines whether or not the coordinate position detected by said coordinate position detector corresponds to said designated key pattern, wherein said second graphic displaying module, when said second coordinate position determining unit determines that said coordinate position is a position corresponding to said key pattern, displays the graphic associated with the key pattern at a predetermined position in said input area.

3. An information processing apparatus according to claim 1, further comprising a valid key setter that, when said touch detector detects a change of touch-off to touch-on, sets the designated key pattern determined by said key pattern designation determining unit as a valid key, wherein
when said first coordinate position determining unit determines that said coordinate position is a position corresponding to the key pattern set as said valid key, the first graphic displaying module displays the graphic associated with the key pattern at a predetermined position in said input area, and when said first coordinate position determining unit determines that said coordinate position is an arbitrary position within said input area, the first graphic displaying module displays the graphic associated with the key pattern in said arbitrary position, and further comprising
a canceling unit that, when said touch detector detects a change of said touch-on to touch-off, cancels the setting of said valid key.

4. The information processing apparatus according to claim 1, wherein when the touch-on state is maintained for a predetermined amount of time on the key pattern, the display of the graphic associated with the key pattern is repeated.

5. An information processing apparatus according to claim 1, wherein when said first coordinate position determining unit determines said coordinate position that is detected by said coordinate position detector immediately before the change from touch-on to touch-off is an arbitrary position within said input area, previously input text characters are converted to image form.

6. An information processing apparatus according to claim 1, wherein
the plurality of key patterns displayed by the firstaphic displaying module are character input key patterns, and
the input area is arranged to display characters input by the character input keys.

7. An information processing apparatus according to claim 6, wherein the predetermined position is set to a position adjacent to the displayed position as a result of displaying performed via the second graphic displaying module.

8. An information processing apparatus according to claim 1, wherein the predetermined position is set to a position adjacent to the displayed position as a result of displaying performed via the second graphic displaying module.

9. An information processing apparatus according to claim 1, wherein
the plurality of key patterns displayed by the first graphic displaying module are text input key patterns, and
the input area is arranged to display text characters input by the character input keys when said first coordinate position determining unit determines said coordinate position that is detected by said coordinate position detector immediately before the change from touch-on to touch-off is a position corresponding to said key pattern.

10. An information processing apparatus according to claim 9, wherein the predetermined position is set to a position adjacent to the displayed position as a result of displaying performed via the second graphic displaying module.

11. An information processing apparatus according to claim 10, wherein when said first coordinate position determining unit determines said coordinate position that is detected by said coordinate position detector immediately before the change from touch-on to touch-off is an arbitrary position within said input area, previously input text characters are converted to image form.

12. A non-transitory storage medium storing a program for information input in an information processing apparatus comprising a display, a touch panel provided in relation to said display, and a processor, wherein said program causes said processor to perform a method comprising:
   causing said display to display a plurality of key patterns and an input area;
   detecting a touch-on to or a touch-off from said touch panel at predetermined time intervals;
   detecting a coordinate position at a time when said touch-on is detected;
   determining, when a change of state from touch-off to touch-on is detected, whether or not the coordinate position detected designates any of said plurality of key patterns;
   determining, after it is determined that some of the key patterns are designated, in response to the detection of a change to touch-off, whether the coordinate position detected immediately before the change to touch-off is a position corresponding to either the key pattern or an arbitrary position within said input area;
   displaying, when it is determined that said coordinate position that is detected immediately before the change from touch-on to touch-off is a position corresponding to said key pattern, a graphic associated with the key pattern at a predetermined position in said input area, wherein the predetermined position is updated to a new position associated with the predetermined position as a result of the displaying of the graphic associated with the key pattern; and
   displaying, when it is determined that said coordinate position that is detected immediately before the change from touch-on to touch-off is an arbitrary position within said input area, the graphic associated with the key pattern at said arbitrary position, wherein the predetermined position is updated to a new position associated with the arbitrary position as a result of the displaying of the graphic associated with the key pattern.

13. A non-transitory storage medium according to claim 12, wherein said program further causes said processor to perform:
   when it is determined that some of the key patterns are designated, counting a time during which said touch-on state continues;
   determining whether or not the duration time counted is equal to or more than a predetermined time;
   when it is determined that that said duration time is equal to or more than said predetermined time, determining whether or not the coordinate position detected is a position corresponding to said designated key pattern; and
   when it is determined that said coordinate position is a position corresponding to said key pattern, displaying the graphic associated with the key pattern at a predetermined position in said input area.

14. A non-transitory storage medium according to claim 12, wherein said program further causes said processor to perform when a change of touch-off to touch-on is detected, setting the designated key pattern determined as a valid key, and
   in the displaying, when it is determined that said coordinate position corresponds to the key pattern set as said valid key, the graphic associated with the key pattern is displayed at a predetermined position in said input area, and when it is determined in said determining that said coordinate position is an arbitrary position within said input area, the graphic associated with the key pattern is displayed at said arbitrary position, and
   said program causes said processor to further perform canceling, when a change of said touch-on to touch-off is detected in said touch detecting step, the setting of said valid key.

15. A non-transitory storage medium according to claim 12, wherein said program causes said processor to perform when the character graphic associated with said key pattern is displayed, setting the position related to the display position of the character graphic as said predetermined position.

16. The non-transitory storage medium according to claim 12, wherein when the touch-on state is maintained for a predetermined amount of time on the key pattern, the display of the graphic associated with the key pattern is repeated.

17. An information input method for an information processing apparatus comprising a display, a touch panel provided in relation to said display, and a processor, the method comprising:
   causing said display to display a plurality of key patterns and an input area;
   detecting a touch-on to or a touch-off from said touch panel at predetermined time intervals;
   detecting a coordinate position at a time when said touch-on is detected;
   determining, when a change of state from touch-off to touch-on is detected, whether or not the coordinate position detected designates any of said plurality of key patterns;
   after it is determined that some of the key patterns are designated, in response to the detection of a change to touch-off, determining whether the coordinate position detected immediately before the change to touch-off is a position corresponding to either the key pattern or an arbitrary position within said input area;
   displaying, when it is determined that said coordinate position that is detected immediately before the change from touch-on to touch-off is a position corresponding to said key pattern, a graphic associated with the key pattern at the predetermined position of said input area, wherein the predetermined position is updated to a new position associated with the predetermined position as a result of the displaying of the graphic associated with the key pattern;
   displaying, when it is determined that said coordinate position that is detected immediately before the change from touch-on to touch-off is an arbitrary position in said input area, the graphic associated with the key pattern at said arbitrary position, wherein the predetermined position is updated to a new position associated with the arbitrary position as a result of the displaying of the graphic associated with the key pattern.

18. The method according to claim 17, wherein when the touch-on state is maintained for a predetermined amount of time on the key pattern, the display of the graphic associated with the key pattern is repeated.

19. An information processing apparatus comprising:
   a display;
   a pointing device configured to designate a position in said display;
   a displaying module for displaying a plurality of key patterns and an input area in said display;
   an operating state detector that repeatedly detects an operating state of said pointing device;

a coordinate position detector that detects a coordinate position at a time when an input being performed by said pointing device is detected by said operating state detector;

a key pattern designation determining unit that, when said operating state detector detects a change of state from a state that an input is not performed by said pointing device to a state that an input is performed by said pointing device, determines whether or not the coordinate position detected by said coordinate position detector designates any of said plurality of key patterns;

a first coordinate position determining unit that, after said key pattern designation determining unit determines that some of the key patterns are designated, in response to the detection of the change of state from a state that an input is performed by said pointing device to a state that an input is not performed by said pointing device by said operating state detector, determines whether the coordinate position detected by said coordinate position detector immediately before the change to the state that an input is not performed by said pointing device is either a position corresponding to said key pattern or an arbitrary position within said input area;

a first graphic displaying module that, when said first coordinate position determining unit determines that said coordinate position that is detected by said coordinate position detector immediately before the change to the state that an input is not performed by said pointing device is a position corresponding to said key pattern, displays a graphic associated with the key pattern at a predetermined position in said input area, wherein the predetermined position is updated to a new position associated with the predetermined position as a result of the displaying of the graphic associated with the key pattern; and a second graphic displaying module that, when said first coordinate position determining unit determines said coordinate position that is detected by said coordinate position detector immediately before the change to the state that an input is not performed by said pointing device is an arbitrary position within said input area, displays the graphic associated with the key pattern at said arbitrary position, wherein the predetermined position is updated to a new position associated with the arbitrary position as a result of the displaying of the graphic associated with the key pattern.

20. An information processing apparatus according to claim 13, further comprising:

a timer that, when said key pattern designation determining unit determines that some of the key patterns are designated, counts a time during which said state that an input is performed by said pointing device state continues;

a duration time determining unit that determines whether or not the duration time counted by said timer is equal to or more than a predetermined time;

a second coordinate position determining unit that, when said duration time determining unit determines that said duration time is equal to or more than said predetermined time, determines whether or not the coordinate position detected by said coordinate position detector corresponds to said designated key pattern, wherein said second graphic displaying module, when said second coordinate position determining unit determines that said coordinate position is a position corresponding to said key pattern, displays the graphic associated with the key pattern at a predetermined position in said input area.

21. An information processing apparatus according to claim 19, further comprising a valid key setter that, when said operating state detector detects a change of a state that an input is not performed by said pointing device to a state that an input is performed by said pointing device, sets the designated key pattern determined by said key pattern designation determining unit as a valid key, wherein when said first coordinate position determining unit determines that said coordinate position is a position corresponding to the key pattern set as said valid key, the first graphic displaying module displays the graphic associated with the key pattern at a predetermined position in said input area, and when said first coordinate position determining unit determines that said coordinate position is an arbitrary position within said input area, the first graphic displaying module displays the graphic associated with the key pattern in said arbitrary position, and further comprising a canceling unit that, when said operating state detector detects a change of said state that an input is performed by said pointing device to a state that an input is not performed by said pointing device, cancels the setting of said valid key.

22. The information processing apparatus according to claim 19, wherein when the state that an input is performed by said pointing device state is maintained for a predetermined amount of time on the key pattern, the display of the graphic associated with the key pattern is repeated.

23. A non-transitory storage medium storing a program for information input in an information processing apparatus comprising a display, a pointing device configured to designate a position in said display, and a processor, wherein said program causes said processor to perform steps comprising:

causing said display to display a plurality of key patterns and an input area;

detecting a state that an input is performed by said pointing device or a state that an input is not performed by said pointing device;

detecting a coordinate position at a time when said state that an input is performed by said pointing device is detected;

determining, when a change of state from the state that an input is not performed by said pointing device to the state that an input is performed by said pointing device is detected, whether or not the coordinate position detected designates any of said plurality of key patterns;

determining, after it is determined that some of the key patterns are designated, in response to the detection of a change to the state that an input is not performed by said pointing device, whether the coordinate position detected immediately before the change to the state that an input is not performed by said pointing device is either a position corresponding to the key pattern or an arbitrary position within said input area;

displaying, when it is determined that said coordinate position that is detected immediately before the change from the state that an input is performed by said pointing device to the state that an input is not performed by said pointing device is a position corresponding to said key pattern, a graphic associated with the key pattern at a predetermined position in said input area, wherein the predetermined position is updated to a new position associated with the predetermined position as a result of the displaying of the graphic associated with the key pattern; and displaying, when it is determined that said coordinate position that is detected immediately before the change from the state that an input is performed by said pointing device to the state that an input is not performed by said pointing device is an arbitrary position within said input area, the graphic associated with the key pattern at said arbitrary position, wherein the predetermined position is updated to a new position associated with the arbitrary position as a result of the displaying of the graphic associated with the key pattern.

24. A non-transitory storage medium according to claim 23, wherein said program further causes said processor to perform:
   when it is determined that some of the key patterns are designated, counting a time during which said state that an input is performed by said pointing device continues;
   determining whether or not the duration time counted is equal to or more than a predetermined time;
   when it is determined that that said duration time is equal to or more than said predetermined time, determining whether or not the coordinate position detected is a position corresponding to said designated key pattern; and
   when it is determined that said coordinate position is a position corresponding to said key pattern, displaying the graphic associated with the key pattern at a predetermined position in said input area.

25. A non-transitory storage medium according to claim 23, wherein said program further causes said processor to perform when a change of a state that an input is not performed by said pointing device to a state that an input is performed by said pointing device is detected, setting the designated key pattern determined as a valid key, and
   in the displaying, when it is determined that said coordinate position corresponds to the key pattern set as said valid key, the graphic associated with the key pattern is displayed at a predetermined position in said input area, and when it is determined in said determining that said coordinate position is an arbitrary position within said input area, the graphic associated with the key pattern is displayed at said arbitrary position, and
   said program causes said processor to further perform canceling, when a change of said state that an input is performed by said pointing device to state that an input is not performed by said pointing device is detected, the setting of said valid key.

26. A non-transitory storage medium according to claim 23, wherein said program causes said processor to perform when the character graphic associated with said key pattern is displayed, setting the position related to the display position of the character graphic as said predetermined position.

27. The non-transitory storage medium according to claim 23, wherein when the state that an input is performed by said pointing device is maintained for a predetermined amount of time on the key pattern, the display of the graphic associated with the key pattern is repeated.

28. An information input method for an information processing apparatus comprising a display, a pointing device configured to designate a position in said display, and a processor, the method comprising:
   causing said display to display a plurality of key patterns and an input area;
   detecting a state that an input is performed by said pointing device or a state that an input is not performed by said pointing device;
   detecting a coordinate position at a time when said state that an input is performed by said pointing device is detected;
   determining, when a change of state from a state that an input is not performed by said pointing device to a state that an input is performed by said pointing device is detected, whether or not the coordinate position detected designates any of said plurality of key patterns;
   after it is determined that some of the key patterns are designated, in response to the detection of a change to the state that an input is not performed by said pointing device, determining whether the coordinate position detected immediately before the change to the state that an input is not performed by said pointing device is either a position corresponding to the key pattern or an arbitrary position within said input area;
   displaying, when it is determined that said coordinate position that is detected immediately before the change from the state that an input is performed by said pointing device to the state that an input is not performed by said pointing device is a position corresponding to said key pattern, a graphic associated with the key pattern at the predetermined position of said input area, wherein the predetermined position is updated to a new position associated with the predetermined position as a result of the displaying of the graphic associated with the key pattern;
   displaying, when it is determined that said coordinate position that is detected immediately before the change from the state that an input is performed by said pointing device to the state that an input is not performed by said pointing device is an arbitrary position in said input area, the graphic associated with the key pattern at said arbitrary position, wherein the predetermined position is updated to a new position associated with the arbitrary position as a result of the displaying of the graphic associated with the key pattern.

29. The method according to claim 28, wherein when the state that an input is performed by said pointing device is maintained for a predetermined amount of time on the key pattern, the display of the graphic associated with the key pattern is repeated.

30. A system comprising:
   a display;
   a pointing device configured to designate a position in said display;
   a displaying module for displaying a plurality of key patterns and an input area in said display;
   an operating state detector that repeatedly detects an operating state of said pointing device;
   a coordinate position detector that detects a coordinate position at a time when an input being performed by said pointing device is detected by said operating state detector;
   a key pattern designation determining unit that, when said operating state detector detects a change of state from a state that an input is not performed by said pointing device to a state that an input is performed by said pointing device, determines whether or not the coordinate position detected by said coordinate position detector designates any of said plurality of key patterns;
   a first coordinate position determining unit that, after said key pattern designation determining unit determines that some of the key patterns are designated, in response to the detection of the change of state from a state that an input is performed by said pointing device to a state that an input is not performed by said pointing device by said operating state detector, determines whether the coordinate position detected by said coordinate position detector immediately before the change to the state that an input is not performed by said pointing device is either a position corresponding to said key pattern or an arbitrary position within said input area;

a first graphic displaying module that, when said first coordinate position determining unit determines that said coordinate position that is detected by said coordinate position unit immediately before the change to the state that an input is not performed by said pointing device is a position corresponding to said key pattern, displays a graphic associated with the key pattern at a predetermined position in said input area, wherein the predetermined position is updated to a new position associated with the predetermined position as a result of the displaying of the graphic associated with the key pattern; and a second graphic displaying module that, when said first coordinate position determining unit determines said coordinate position that is detected by said coordinate position detector immediately before the change to the state that an input is not performed by said pointing device is an arbitrary position within said input area, displays the graphic associated with the key pattern at said arbitrary position, wherein the predetermined position is updated to a new position associated with the arbitrary position as a result of the displaying of the graphic associated with the key pattern.

31. A system according to claim 30, further comprising:

a timer that, when said key pattern designation determining unit determines that some of the key patterns are designated, counts a time during which said state that an input is performed by said pointing device state continues;

a duration time determining unit that determines whether or not the duration time counted by said timer is equal to or more than a predetermined time;

a second coordinate position determining unit that, when said duration time determining unit determines that said duration time is equal to or more than said predetermined time, determines whether or not the coordinate position detected by said coordinate position detector corresponds to said designated key pattern, wherein said second graphic displaying module, when said second coordinate position determining unit determines that said coordinate position is a position corresponding to said key pattern, displays the graphic associated with the key pattern at a predetermined position in said input area.

32. A system according to claim 30, further comprising a valid key setter that, when said operating state detector detects a change of a state that an input is not performed by said pointing device to a state that an input is performed by said pointing device, sets the designated key pattern determined by said key pattern designation determining unit as a valid key, wherein when said first coordinate position determining unit determines that said coordinate position is a position corresponding to the key pattern set as said valid key, the first graphic displaying module displays the graphic associated with the key pattern at a predetermined position in said input area, and when said first coordinate position determining unit determines that said coordinate position is an arbitrary position within said input area, the first graphic displaying module displays the graphic associated with the key pattern in said arbitrary position, and further comprising a canceling unit that, when said operating state detector detects a change of said state that an input is performed by said pointing device to a state that an input is not performed by said pointing device, cancels the setting of said valid key.

* * * * *